US005804057A

United States Patent [19]

Zhou et al.

[11] Patent Number: 5,804,057

[45] Date of Patent: Sep. 8, 1998

[54] METHOD OF REMOVING METAL SALTS FROM SOLUTION BY ELECTROLYSIS AN ELECTRODE CLOSELY ASSOCIATED WITH AN ION EXCHANGE RESIN

[75] Inventors: Chengdong Zhou, Centerville; E. Jennings Taylor, Troy; Robert P. Renz, Centerville; Eric C. Stortz, Kettering; Jenny J. Sun, Tipp City, all of Ohio

[73] Assignee: Faraday Technology, Inc., Dayton, Ohio

[21] Appl. No.: 659,926

[22] Filed: Jun. 7, 1996

[51] Int. Cl.[6] .................... C02F 1/469

[52] U.S. Cl. .................... 205/702; 205/750; 205/770; 205/771; 205/772; 204/551; 204/252

[58] Field of Search .................... 205/702, 750, 205/770, 771, 772; 204/551, 252

[56] References Cited

U.S. PATENT DOCUMENTS

| | | | |
|---|---|---|---|
| 4,790,918 | 12/1988 | Bridger et al. | 204/551 |
| 5,007,989 | 4/1991 | Nyberg et al. | 205/702 |
| 5,225,056 | 7/1993 | Bridger et al. | 205/771 |
| 5,240,572 | 8/1993 | Turner et al. | 204/149 |
| 5,364,527 | 11/1994 | Zimmermann et al. | 205/702 |
| 5,536,387 | 7/1996 | Hill et al. | 205/750 |
| 5,584,981 | 12/1996 | Turner et al. | 204/551 |

*Primary Examiner*—Arun S. Phasge

*Attorney, Agent, or Firm*—Vorys, Sater, Seymour and Pease

[57] ABSTRACT

Metal salts are removed from solution in an electrolyte by subjecting the solution to electrolysis in a cell having an anode that has an anion exchange membrane closely associated therewith which sequesters the anion of the salt. The cathode may also be provided with a closely associated cation exchange membrane that sequesters, at least partially, the cation of the salt. A metal salt solution can be regenerated by reversing the polarity of the electrodes and conducting an electrolysis using fresh electrolyte.

14 Claims, 4 Drawing Sheets

METHOD OF REMOVING METAL SALTS FROM SOLUTION BY ELECTROLYSIS AN ELECTRODE CLOSELY ASSOCIATED WITH AN ION EXCHANGE RESIN

ORIGIN OF THE INVENTION

The experimental work leading to this invention was funded in part by U.S. Environmental Protection Agency Contract No. 68D50079.

BACKGROUND OF THE INVENTION

1. Field of the Invention

This invention relates to methods of removing metal salts from solution in electrolytes and more particularly to recovery of metal salts from aqueous solutions using an electrolytic cell having an electrode closely associated with an ion exchange resin and regeneration of the metal salt solutions.

2. Brief Description of the Prior Art

Removal of metals from aqueous solutions by electrodeposition at a cathode in an electrolytic cell is a procedure that is widely used in electrowinning of metals from their ores as well as in the purification of waste solutions containing metal salts. The metals are generally recovered by circulating an aqueous solution containing a salt of the metal through an electrolytic cell and passing an electric current through the cell to deposit the metal on a cathode. The deposited metal may be removed from the cell and further processed, or it may be redissolved electrolytically into another electrolyte to prepare a purified metal salt solution.

A major industrial area wherein metal salts have to be removed from waste water is in metal finishing. Typically such finishing includes operations such as electroplating and anodizing that use large volumes of electrolyte solutions and generate correspondingly large volumes of waste solutions in the form of depleted plating solutions and waste water from rinsing of plated and/or anodized articles. These waste solutions contain materials, especially metals, that are both valuable and toxic to the environment. Consequently, it is both economically desirable to recover and recycle the metals and environmentally necessary to reduce the metal salt concentration in the waste solutions to a level that permits discharge to municipal sewage systems or directly into environmental bodies of water such as rivers or the ocean.

The conventional methods used to treat metal-containing waste water in the plating and metal finishing industry include precipitation, ion-exchange, electrowinning, reverse osmosis, evaporation and freeze crystallization. Currently, precipitation is the most widely used method. However, precipitation produces a sludge containing heavy metals that constitutes a secondary waste having its own disposal problems. Precipitation also requires the use of expensive chemical reagents, and the presence of such reagents in the waste water precludes recycling it to the plating and finishing operation. Ion-exchange uses a two-step procedure in which the waste water is passed successively through beds of cation and anion exchange resins. The effluent is neutral water that can be reused. However, the metal salts must be eluted from the ion exchange resins with regenerating solutions, and the regenerated solutions so obtained (eluant) may not be recyclable to the plating operations due to incompatibility of the anions in the eluant and the plating solutions. Conventional electrowinning can recover metal in metallic form which is then reprocessed, usually off-site, to prepare fresh plating solution. However, the metal is not directly recycled to the plating operation. In addition, effluent water from electrowinning is not neutral and consequently cannot be recycled to rinse operations in the plating process. Reverse osmosis, evaporation, and freeze crystallization treat wastewater by removing the solvent, i.e., water. Therefore these technologies are not economical for treatment of large volumes of dilute wastewater.

Accordingly, a need has continued to exist for a method of removing metal salts from aqueous solutions wherein the anion of the salt may be recovered simultaneously with the metal ion, whereby both ions are available for electrolytic reconstitution of the metal salt solution.

SUMMARY OF THE INVENTION

The need for a method of removing metal salts from waste electrolytes in a form from which a useful solution of the salt can be easily reconstituted has now been satisfied by the method of this invention which comprises the steps of 1) introducing a solution of a metal salt, dissociated into a cation species and an anion species, in an electrolyte into an electrolytic cell having a first electrode and a second electrode, wherein the second electrode is closely associated with an anion exchange resin capable of sequestering the anion species;
2) retaining the electrolyte solution of the metal salt in the electrolytic cell and passing an electric current through the cell from said second electrode to the first electrode for a period of time sufficient to sequester at least a portion of the cation species at said first electrode and a fraction of said anion species in the ion exchange resin associated with said second electrode, thereby generating an electrolyte depleted of the metal salt; and
3) removing the depleted electrolyte from the electrolytic cell.

The original solution of a metal salt in an electrolyte can be regenerated by the additional steps of 4) introducing into the electrolytic cell a regenerand electrolyte capable of dissolving the metal salt; and
5) passing an electric current through the electrolytic cell from the first electrode to the second electrode for a period of time sufficient to release at least a portion of the cationic species from the first electrode and the anionic species from the ion exchange resin associated with the second electrode.

Accordingly, it is an object of the invention to provide a method of removing metal salts from solution in an electrolyte.

A further object is to provide a method for removing metal salts from solution in an electrolyte and regenerating a solution of the metal salt.

Further objects of the invention will be apparent from the description of the invention which follows.

DETAILED DESCRIPTION OF THE INVENTION AND PREFERRED EMBODIMENTS

In the removal from solutions of heavy metals present therein in the form of their salts and the corresponding anions such as nitrate/nitrite, phosphate, sulfate, fluoborate, chromate, fluoride, chloride, bromide, iodide and the like, electrodes provided with ion exchange resins are used. Such electrodes comprise an electrode, preferably an electrode having a large surface area such as a particulate or porous electrode, closely associated with an ion exchange resin. The close association between the electrically conductive material of the electrode and the ion exchange resin is achieved by close physical proximity between the electricaly conductive material and the ion exchange resin. The resin may be coated onto the electrically conductive material, or in contact with the electrically conductive material, or positioned adjacent to the electrically conductive material. In such an electrical conductor-ion exchange resin association, the close association between the electrical conductor and the ion exchange resin provides that the products of electrochemical reaction at the surface of the electrically conductive material are promptly available, for example by diffusion over short distances, e.g., of no more than a few millimeters, to react with the ion exchange resin without substantial interaction with chemical species in the body of the electrolyte in the electrolytic cell.

A cathode used in the process and electrolytic cell of the invention typically contains high surface area carbon, e.g., graphite in particulate form, mixed with an ion exchange resin capable of sequestering heavy metal ions. Such ion exchange resins typically sequester heavy metals by chelating and are present in the hydrogen ion form (RH). Preferred cation exchange resins are those that have high selectivity for heavy metals, even in the presence of high sodium and $H^+$ concentrations.

An anode according to the invention typically contains high surface area carbon and an anion exchange resin, usually in hydroxyl form (POH). Because the anions of the metal salts, unlike the metals, are generally not deposited at the anode, and in many cases are not dischargeable by electrolytic reactions at the anode, the ion exchange resin associated with the anode must hold all the anions to be removed from the waste solution, either in a batch purification method or over a period of time that a continuous process is operated before the regeneration phase of the process is performed. Consequently, the anode will typically be associated with a substantially larger amount of ion exchange resin than the cathode.

Figure 1:
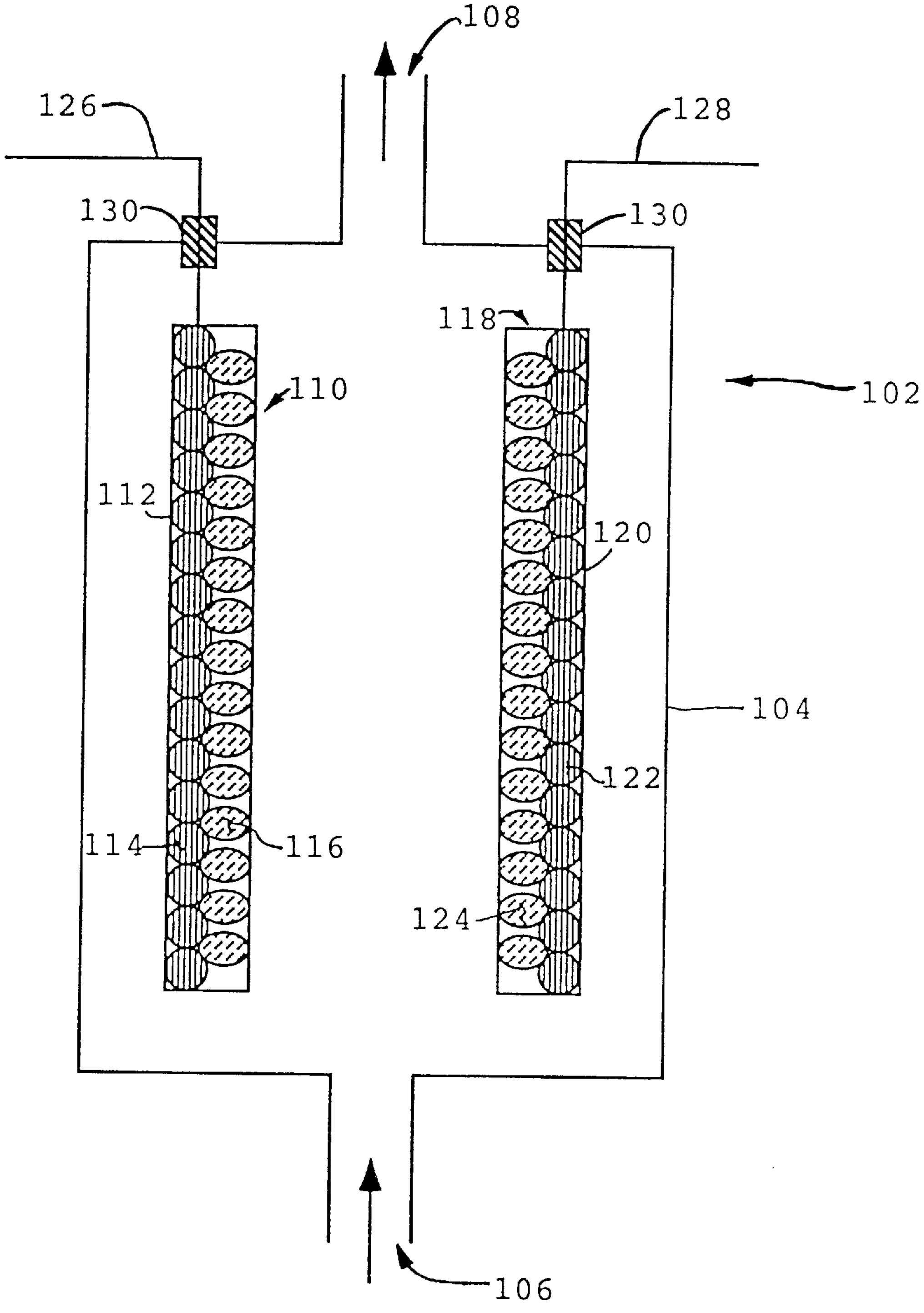
FIG. 1 schematically illustrates an electrolytic cell useful in the practice of this invention wherein both the anode and the cathode are associated with ion exchange electrodes.

FIG. 1 illustrates schematically an electrolytic cell using electrodes provided with ion exchange resins suitable for practicing the method of the invention. An electrolytic cell apparatus 102 comprises a chamber 104 which contains the electrolyte to be processed. The chamber 104 is provided with an inlet 106 through which the electrolyte is introduced into the chamber 104 and an outlet 108 through which the treated electrolyte leaves the chamber. The electrolyte may be recirculated through the chamber in the course of treatment by external conventional pipes, tanks, pumps, and the like, not shown. The cathode 110 of the electrolysis cell 102 comprises a container 112 which is freely permeable to electrolyte, e.g., a container made from perforated material or screen, but capable of retaining a particulate electrode material, e.g., graphite in particulate form. Within the anode container 112 is a particulate electrode 114 comprised of electrically conductive particles, e.g., graphite particles, and closely associated with the electrode particles 114 is an ion exchange resin, represented schematically at 116. The ion exchange electrode may be coated onto the electrically conducting particles or both the electrically conducting particles and particles of the ion exchange resin may be compressed into the container to prepare an electrode that permits free access of electrolyte to the interior of the electrode structure. The cell 102 also contains an anode 118 constructed along the lines of the cathode, having a container 120 which holds a mixture of electrically conductive particles 122 and an anion exchange resin 124. The cell 102 is provided with a cathode lead 126 and an anode lead 128 which are electrically conducting members, e.g., metal wires, that supply electric current to the electrodes 110 and 118. The leads 126 and 128 pass through the walls of the cell through insulating members 130. Because the anion exchange resin 124 of the anode 120 has to sequester anions, which are not plated onto the electrically conducting particles of the anode, the amount of anion exchange resin 124 associated with the anode 118 is typically substantially greater than the amount of cation exchange resin 116 associated with the cathode 110.

During the metal salt removal process of the invention, a solution containing a metal salt in water or other electrolyte, wherein the metal salt is dissociated into a metal cation and an associated anion, is passed through the electrolytic cell. An electrical potential is applied to the electrodes of the cell whereby conventional electrochemical reactions occur at the cathode and anode. Diffusion and electromigration of the ions also bring the ions of the metal salt into contact with the cation and anion exchange resins, whereby conventional ion exchange reactions occur.

At the cathode the metal ions are plated onto the electrically conductive particles of the cathode. The cation exchange resin associated with the cathode assists in the removal of the metal ions from the solution by sequestering those metal ion that come into contact with it via diffusion and/or convection of the electrolyte through the cell, and then releasing them to be plated onto the cathode. Consequently, the concentration of metal ions adjacent to the cathode is enhanced by the presence of the cation exchange resin, which increases the efficiency of the plating process. Furthermore, $OH^-$ ions generated at the cathode by the liberation of hydrogen from electrolysis of water at the cathode or by other possible reduction reactions at the cathode, such as the reduction of nitrate or nitrite, are neutralized by the $H^+$ ions generated by the ion exchange reaction between the metal ions and the cation exchange resin. Therefore the pH near the cathode tends to remain more acidic than in a conventional electrowinning process and the formation of a non-conductive metal hydroxide barrier layer is prevented. It is also possible according to the invention to provide a sufficient amount of cation exchange resin in association with the cathode to retain a substantial fraction of the cation species sequestered by the resin rather than plated onto the electrically conductive material of the electrode. Metal ions that form the metal component of metal salts that can be removed from solution by the process of this invention and can be sequestered and/or plated out at the cathode-cation exchange resin electrode include copper ions, tin ions, lead ions, zinc ions, chromium ions, nickel ions, silver ions, gold ions, and the like.

At the anode both electrochemical and ion exchange reactions also take place. The principal electrochemical reaction is the evolution of oxygen by electrolysis of water, with release of $H^+$ ions into the electrolyte. The ion exchange reactions involve sequestration of whatever anion accompanies the metal in the metal salt. Accordingly, anions such as nitrate/nitrite, sulfate, phosphate, carbonate, fluoborate, chromate, fluoride, chloride, bromide, iodide and the like are sequestered by the ion exchange resin at the anode. The $OH^-$ ions released by exchange with the anions combine with the $H^+$ ions generated by electrolysis at the anode to form water.

Accordingly, the total electrolytic reaction produced in the process of the invention is the removal of the metal salt from the solution, leaving behind an electrolyte depleted of the salt to the extent that is practical.

As the metal salt removal proceeds, the electrodes become laden with the metal (and/or metal ion if substantial amounts of cation resin are associated with the cathode) and anion, respectively, and the electrolyte becomes depleted of the metal salt. At some point, e.g., when the ion exchange resins associated with the electrodes can accept no more metal and/or anions, or when the metal salt concentration in the electrolyte has been sufficiently reduced, a regeneration step is performed wherein the ions are removed from the electrodes and a metal salt solution is regenerated.

Although conventional procedures can be used to remove the metal and anions from the cathode and anode, respectively, it is preferred to regenerate the electrodes and a metal salt solution by reversing the electrolytic purification process. The purified electrolyte is removed from the electrolytic cell and a fresh electrolyte to receive the metal salt is introduced. This electrolyte can be a pure material such as water, or it may be a depleted plating solution containing a relatively low concentration of the metal salt which is to be increased by the regeneration process. The regeneration of the electrodes and the metal salt solution is accomplished by reversing the polarity of the electric current through the cell to redissolve the metal into the electrolyte and release the anions from the anion exchange resin associated with the anode. The anode and cathode accordingly become reversed during the regeneration step. When the electrodes have been restored to their original condition by removal of the metal and the anion, the regenerated metal salt solution is removed from the cell and another cycle of metal ion removal can be performed on a fresh batch of metal salt solution.

The practice of the invention can be illustrated by application of the process to removal of lead-tin fluoborate from waste water used to rinse printed circuit boards after electroplating with a tin-lead fluoborate plating solution.

Figure 2:
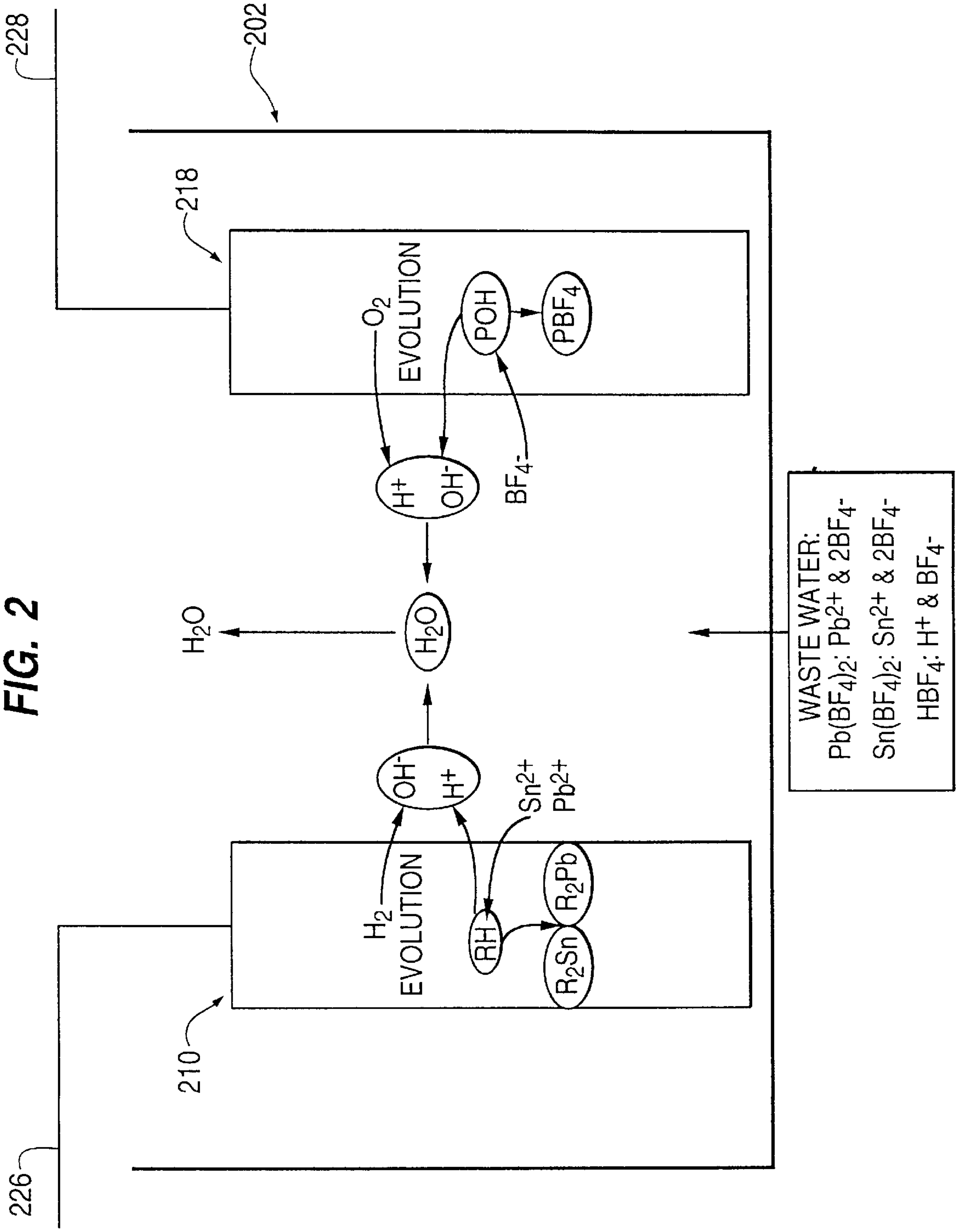
FIG. 2 illustrates the process of the invention wherein a metal salt is removed from a solution in an electrolyte.

FIG. 2 illustrates the treatment stage of the process using a schematic illustration of an electrolytic cell used in the process. FIG. 2 shows a treatment cell 202 having a chamber 204 that contains the liquid to be treated as it is circulated therethrough. The cell contains a cathode, shown at 210, comprised of a mixture of graphite particles and particles of cation exchange resin, and an anode, shown at 218, of similar construction containing graphite particles and particles of anion exchange resin. Electrically conductive leads 226 and 228 connect the electrodes to an external source of electric current, not shown.

As shown in FIG. 2, during the treatment process waste water containing $Pb(BF_4)_2$, $Sn(BF_4)_2$ and $HBF_4$, in the form of the dissociated ions $Pb^{2+}$, $Sn^{2+}$, $H^+$ and $BF_4^-$, is introduced into the electrolytic cell. Typically, a batch of waste water to be processed is kept in a holding tank, not shown, and the solution is circulated through the cell and back to the holding tank while it is being treated. The $Pb^{2+}$, $Sn^{2+}$, and $H^+$ will migrate to the cathode under the electric field and the $Pb^{2+}$ and $Sn^{2+}$ undergo ion exchange with the cation exchange resin RH. At the same time, the hydrogen evolution reaction occurs at the cathode with production of $OH^-$ ions. The $H^+$ generated by the cation exchange reaction will combine with the $OH^-$ generated via the hydrogen evolution reaction to form water. Depending on the quantity of cation exchange resin associated with the cathode, some of the tin and lead may be plated out on the graphite particles of the electrode. The $BF_4^-$ will migrate to the anode under the electric field and undergoes an ion exchange reaction with the anion exchange resin POH. The $OH^-$ generated via the anion exchange reaction will combine with $H^+$ generated by the oxygen evolution reaction occurring at the anode to form water. Consequently, neutral water is generated by treatment of the salt solution by the process of the invention. The neutral water can be recycled to the rinse operation.

Regeneration of the electrodes can be conducted by reversing the polarity of the electrodes, whereby the lead and tin are dissolved from the cathode and/or $Pb^{2+}$ and $Sn^{2+}$ ions are released from the cation exchange resin and $BF_4^-$ ions are released from the anion exchange resin to reconstitute the solution of tin and lead fluoborate. However, if the regeneration is conducted in a single compartment cell such as that illustrated in FIG. 2, some of the $Pb^{2+}$ and $Sn^{2+}$ may migrate to the anode (now become a cathode by the reversal of cell polarity) and be deposited there. Consequently, it is preferred to perform the treatment and regeneration process in a slightly more elaborate cell having each electrode in a separate compartment separated by an ion-selective permeable membrane.

The practice of the invention is illustrated by the following examples which are intended to be illustrative only and do not limit the scope of the invention in any way.

EXAMPLE 1

This example illustrates a preferred embodiment of the invention using an electrolysis cell having two compartments separated by a selective ion-permeable membrane.

Figure 3:
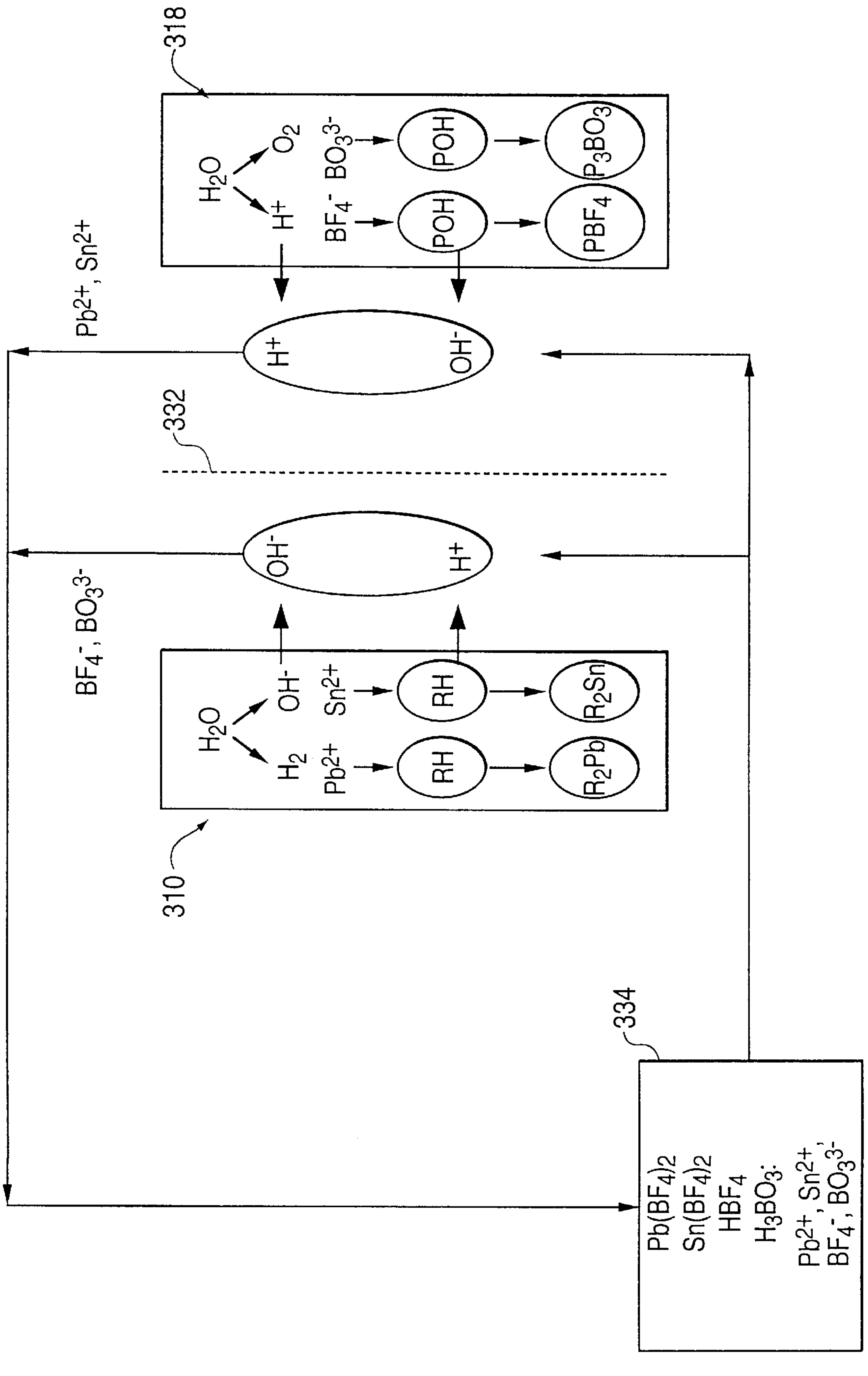
FIG. 3 illustrates a preferred embodiment of the metal salt removal process of the invention using a two-compartment electrolytic cell.
Figure 4:
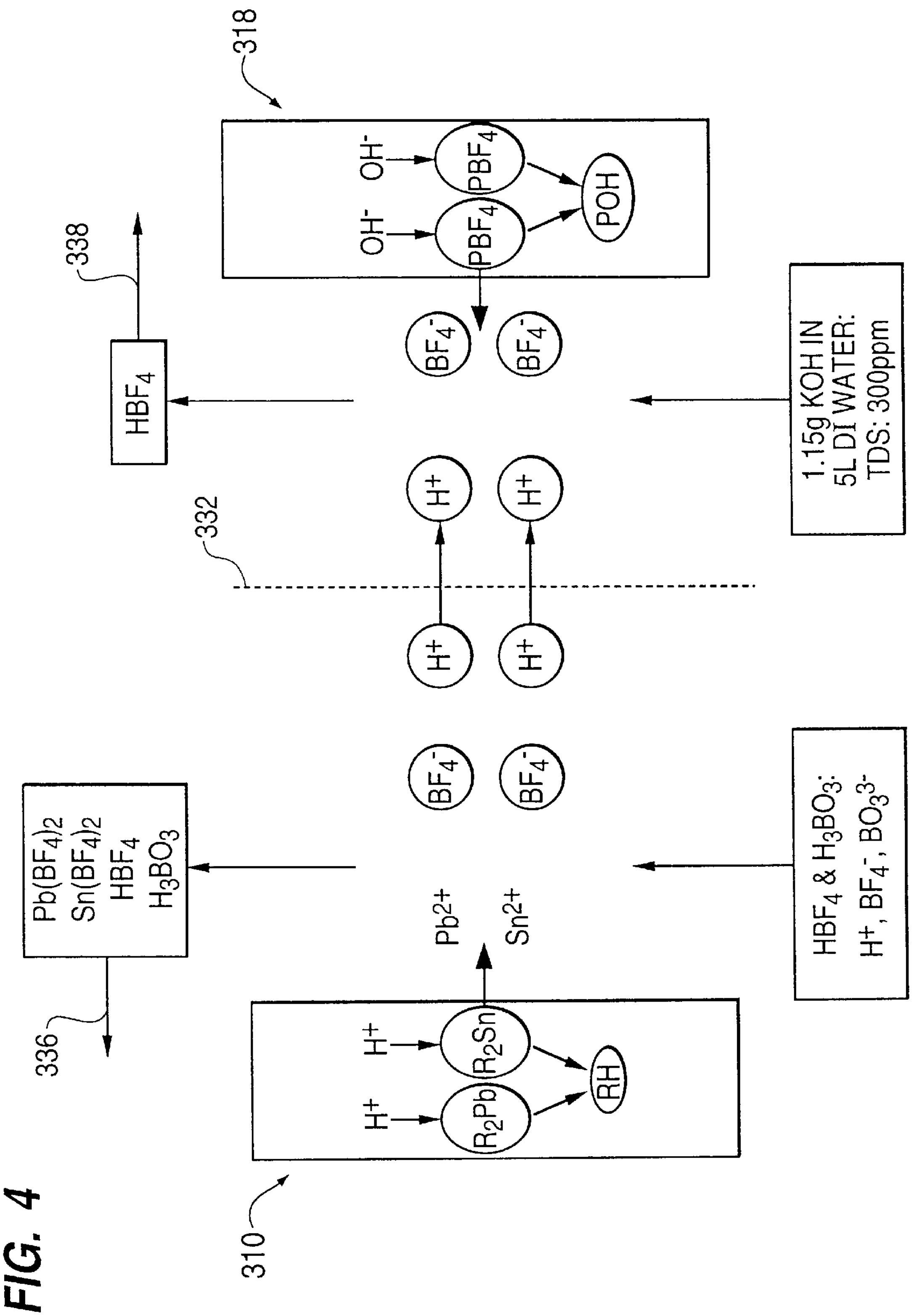
FIG. 4 illustrates regeneration of the electrodes and the metal salt solution using the cell illustrated in FIG. 3.

The process of this embodiment is illustrated in FIGS. 3 and 4 wherein the cell is represented very schematically. In the cell of FIGS. 3 and 4 the cathode and anode, comprising particles of graphite and cation and anion exchange resins, respectively, are shown at 310 and 318. The cell incorporates a membrane 332 (Nafion® 450, E. I. du Pont de Nemours & Co., Inc.) selectively permeable to hydrogen ions but not to $Pb^{2+}$ and $Sn^{2+}$ ions. The flow of solution through the cell is shown by the flow arrows.

Using the cell of FIGS. 3 and 4, an experiment was conducted to treat 5 liters (L) of simulated Pb/Sn rinse water containing $Pb(BF_4)_2$, $Sn(BF_4)_2$, $HBF_4$, and $H_3BO_3$. Lead and tin concentrations were 180 ppm and 330 ppm, respectively. The solution pH was 1.9. The simulated rinse water was prepared with tap water, which contained $Ca^{2+}$, $Na^+$, $Mg^{2+}$, etc. The total dissolved solids (TDS) of the simulated water was 2800 ppm. The cathode in the cell contained 390 g of graphite particles and 60 g of cation exchange resin; the anode contained 90 g of graphite particles and 430 g of anion exchange resin. A selectively permeable membrane of Nafion® 450 separated the anode compartment from the cathode compartment. During the treatment process the simulated Pb/Sn rinse water was pumped through both the cathode and the anode compartment.

In the cathode compartment, $Pb^{2+}$ and $Sn^{2+}$ are removed from the catholyte through the cation exchange reaction with cation exchange resin RH whereby $H^+$ ions are generated. The hydrogen evolution reaction generates $OH^-$ which tends to react with the $H^+$ from the ion exchange reaction to form neutral water. $BF_4^-$ and $BO_3^{3+}$ are not removed in the cathode compartment; consequently, these anions remain in the electrolyte leaving the cathode compartment.

In the anode compartment $BF_4^-$ and $BO_3^{3+}$ are removed from the anolyte through the anion exchange reaction and generate $OH^-$. The oxygen evolution reaction at the anode generates $H^+$ which tends to react with the $OH^-$ from the ion exchange reaction to form neutral water. $Pb^{2+}$ and $Sn^{2+}$ are not removed in the anode compartment; consequently, these cations remain in the electrolyte leaving the anode compartment.

The anolyte and catholyte mix together at the outlet of the cell and are returned to the holding tank 334 for recycling through the cell. Inasmuch as cations are removed in the cathode compartment and anions in the anode compartment, the net concentration of the salt in the electrolyte after passing through the cell is reduced. As the electrolyte is recirculated through the cell the concentration of metal salt is decreased until the electrolyte is sufficiently pure to be returned to the rinse operation or discharged.

In this experiment the anode and cathode surface area was about 0.5 $ft^2$ (464.5 $cm^2$). The cell voltage was controlled at 45 volts, and the cell current decreased from 6 A to less than 1 A during the experiment. During a period of 45 minutes the tin concentration decreased from 330 ppm to less than 1 ppm, the lead concentration decreased from 180 ppm to 0.7 ppm, and the pH of the solution rose from 1.9 to 5.2. The total dissolved solids in the treated solution was less than 5 ppm. Such a purified solution can be used as rinse water for cleaning the solder-plated circuit boards after they are removed from the plating bath.

A regeneration experiment was next performed to regenerate the electrodes of the treatment cell and prepare a metal salt solution that could be recycled to a circuit board solder-plating operation. In the regeneration step separate electrolytes were pumped through the anode and cathode compartments and the effluent for each compartment was kept separate. In the regeneration step the polarity of the electrodes was reversed. Accordingly, the graphite-cation exchange resin electrode that served as the cathode in the separation step became an anode-cation exchange resin electrode. Similarly, the anode-anion exchange resin electrode used in the metal salt removal process became a cathode-anion exchange resin electrode. Five liters of acid which contained 150 g/L free fluoboric acid and 30 g/L of boric acid (the acid used in a Pb/Sn plating bath) were pumped through the anode-cation resin compartment (original cathode-cation resin compartment) in the regeneration process. Five liters of deionized (DI) water containing 1.15 g of KOH were pumped through the cathode-anion resin compartment (original anode-anion resin compartment). The TDS of the KOH water was 300 ppm. The regeneration process is illustrated schematically in FIG. 4.

In the anode-cation resin compartment, the $H^+$ generated during the oxygen evolution reaction released $Pb^{2+}$ and $Sn^{2+}$ from the cation exchange resin. Only a small fraction of the $Pb^{2+}$ and $Sn^{2+}$ so released could enter the cathode-anion resin compartment (original anode-anion resin compartment) because the transport rate of the $H^+$ ions through the Nafion® membrane is ten times greater than that of the $Pb^{2+}$ and $Sn^{2+}$ ions. Consequently, most of the ions passing through the membrane were $H^+$ ions from the dissociation of $HBF_4$ and $HBO_3$. The free $BF_4^-$ so formed stoichiometrically balances the $Pb^{2+}$ and $Sn^{2+}$ released from the cation exchange resin to provide a solution of $Pb(BF_4)_2$ and $Sn(BF_4)_2$ in ionized form. Thus, after regeneration, the solution in this loop contains $Pb(BF_4)_2$, $Sn(BF_4)_2$, $H(BF_4)$, and $H_3BO_3$. The acid concentration is lower that the acid concentration in the plating bath because the regenerating electrolyte contained 150 g/L of free fluoboric acid and 30 g/L of boric acid (as used in the plating bath), but some of the $H^+$ migrated to the cathode-anion resin compartment. Therefore, the regenerated solution in this loop can be recycled to the plating operation, as indicated by arrow 336, after adjustment of the Pb/Sn concentration and the acid concentration.

In the cathode-anion resin compartment, the $OH^-$ generated during the hydrogen evolution released cations, mostly $BF_4^-$, from the anion exchange resin. These $BF_4^-$ ions combined with $H^+$ ions transported from the anode-cation resin compartment to form $HBF_4$. Because the initial regenerand solution contained only 1.15 g of KOH in 5 L of DI water the TDS of the solution was only 300 ppm, which is in the TDS range of tap water (300–350 ppm). Consequently, after regeneration the solution in this loop becomes concentrated fluoboric acid in tap water, and it also can be recycled to the plating operation, as indicated by arrow 338, and used to adjust the acid concentration of the plating bath.

During the regeneration experiment, the cell voltage was controlled at 47 volts, and the cell current increased from 4 A to 5 A. Lead concentration in the anode-cation resin loop increased from 0 to 20 ppm after 30 minutes of operation. However, some lead was also detected in the cathode-anion resin compartment, which indicated that some lead was being transported through the ion-selective Nafion® membrane. Accordingly, the regeneration experiment was terminated and a decision was made to use a lower cell current in further experiments.

EXAMPLE 2

This example illustrates the application of the treatment and regeneration process of Example 1 to another waste solution using slightly different experimental conditions.

The experiment of Example 1 was repeated using in the treatment step ten liters of wastewater from the rinsing operation of a commercial circuit board solder-plating operation. The apparatus and procedure were similar to those described above.

In the treatment step the lead concentration of the solution decreased from 24.3 ppm to about 600 ppb, the pH of the solution increased from 2.6 to 6.6, and the TDS decreased from 650 ppm to 60 ppm. Accordingly, the treated solution could be reused as rinse water in the solder-plating operation.

In the regeneration step the regenerand solutions for the anode-cation resin compartment and the cathode-anion resin compartment were similar to those of the previous experiment, i.e., 10 L of acid containing 150 g/L of fluoboric acid and 30 g/L of boric acid for the anode-cation resin loop, and 7 L of DI water containing 1.15 g of KOH for the cathode-anion resin loop. The cell current was controlled at 3 A. Over a period of 45 minutes, the lead concentration in the anode-cation resin compartment increased to 20 ppm and the pH changed from 1.0 to 1.4. This regenerated solution can be recycled to the plating operation after adjustment of the Pb/Sn concentration and acid concentration. In the cathode-anion resin compartment, the pH changed from 8.9 to 3 and the TDS increased from 250 ppm to 1350 ppm, but the lead concentration amounted to only 0.7 ppm. Accordingly, this solution contains fluoboric acid and can also be used for the preparation of the plating bath. Thus, both of the regenerated solutions can be recycled to the plating process.

EXAMPLE 3

This experiment illustrates the use of the process of the invention in successive cycles of treatment and regeneration for actual tin-lead plating rinse water collected from a commercial plating operation.

The two-compartment cell described in Example 2 was used in four successive treatment cycles with three intermediate regeneration cycles to assess the capability of the resins to be completely regenerated. The relevant conditions were as follows Electrolysis cell:

Anode and cathode area: 0.5 $ft^2$ (464.5 $cm^2$)

Anode: 100 g graphite+400 g anion exchange resin

Cathode: 390 g graphite+60 g cation exchange resin

Compartment separator membrane: Nafion® 450

Waste Water treatment:

Waste water composition (initial):

Lead: 64 ppm

Tin: 180 ppm

TDS: 2600 ppm pH: 2.3

Experimental conditions:

Test solution: 5 L

Flow rate: 3 L/min

Voltage (controlled): 46 V

During the treatment experiments, no current was passed through the cell for the first 10 minutes. Thereafter, the voltage was controlled at 46 V.

The results of the four treatment cycles are summarized in Table 1 below.

TABLE 1

| | pH | | Pb Conc. (ppm) | | Sn Conc. (ppm) | | TDS (ppm) | |
|---|---|---|---|---|---|---|---|---|
| Cycle | Start | End | Start | End | Start | End | Start | End |
| 1 | 2.3 | 4.0 | 64 | 0.4 | 180 | 0.6 | 2600 | 50 |
| 2 | 2.3 | 4.0 | 64 | 0.4 | 180 | 0.3 | 2600 | 90 |
| 3 | 2.3 | 4.0 | 64 | 0.5 | 180 | 0.1 | 2600 | 40 |
| 4 | 2.3 | 3.8 | 64 | 0.7 | 180 | <1 | 2600 | 100 |

Regeneration:

After each treatment cycle, the cell was regenerated by reversing the polarity of the electrodes as described in Example 2. In each regeneration cycle 5 L of plating bath acid (150 g/L of fluoboric acid and 30 g/L of boric acid) was circulated through the anode-cation resin compartment and 30 L of DI water containing 4 g NaOH (TDS: 400 ppm) were circulated through the cathode-anion resin compartment.

During the regeneration experiments the cell current was controlled at 3 A The corresponding voltage was about 13–15 V. For the first regeneration cycle, cell current of 3 A was maintained throughout the test. During the second and third regeneration, cell current of 3 A direct current (DC) and then an interrupted current (IC) with a 3 A peak current, 1 minute on and 1 minute off alternating, was used.

The results of the regeneration experiments are summarized in Table 2 below.

TABLE 2

| | Lead Conc. (ppm) | | | | Lead | | |
|---|---|---|---|---|---|---|---|
| | Cation Resin Compartment | | Anion Resin Compartment | | Regenerated | TDS (ppm) | |
| Cycle | Start | End | Start | End | (%) | Start | End |
| 1 | 0 | 33 | 0 | 2.5 | 75% | 400 | 610 |
| 2 | 0 | 55 | 0 | 0.17 | 87.5% | 400 | 600 |
| 3 | 0 | 50 | 0 | 0.17 | 79% | 300 | 600 |

The data permit the following conclusions to be drawn:

1) The lead can be regenerated greater than 75% in all of the regeneration cycles.

2) With interrupted current the regeneration is better because a greater proportion of the lead remains in the anode-cation resin compartment and less lead is transported through the ion-selective membrane to the cathode-anion resin compartment.

3) The TDS change in the cathode-anion resin compartment indicates that most of the anions are regenerated.

The results of the experiment demonstrate the technical feasibility of recycling waste water from solder-plating operations back to the to the plating and rinsing steps. In particular, waste rinse water can be purified and reused for rinsing. The metals and anions removed from the waste rinse water can be directly returned to solutions that can be used to prepare fresh plating bath solutions. Finally, the electrolytic cell using electrodes associated with ion exchange resins can be successfully regenerated without loss in performance.

The invention having now been fully described, it should be understood that it may be embodied in other specific forms or variations without departing from its spirit or essential characteristics. Accordingly, the embodiments described above are to be considered in all respects as illustrative and not restrictive, the scope of the invention being indicated by the appended claims rather than the foregoing description, and all changes which come within the meaning and range of equivalency of the claims are intended to be embraced therein.

We claim:

1. A method for removing a metal salt from an electrolyte containing the salt comprising 1) introducing a solution of a metal salt in an electrolyte wherein said metal salt is dissociated into a cation species and an anion species into an electrolytic cell having a first compartment and a second compartment, said compartments being separated by a selectively permeable membrane favoring the passage of hydrogen ions over the passage of said cation species and said anion species, said cell having a first electrode in said first compartment and a second electrode in said second compartment, said second electrode having closely associated therewith an anion exchange resin capable of sequestering said anion species;

2) retaining said metal salt in said electrolytic cell and passing an electric current through said cell from said second electrode to said first electrode for a period of time sufficient to sequester a fraction of said cation species at said first electrode and a fraction of said anion species in said ion exchange resin associated with said second electrode, whereby an electrolyte depleted of said metal salt is generated;

3) removing said depleted electrolyte from said electrolytic cell.

2. The method of claim 1 wherein said cation species is selected from the group consisting of copper ions, tin ions, lead ions, zinc ions, chromium ions, nickel ions, silver ions, and gold ions.

3. The method of claim 1 wherein said anion species is selected from the group consisting of sulfate ions, sulfite ions, fluoborate ions, nitrate ions, nitrite ions, phosphate ions, carbonate ions, chromate ions, fluoride ions, chloride ions, bromide ions, and iodide ions.

4. The method of claim 1 wherein said first electrode has closely associated therewith an cation exchange resin capable of sequestering said cation species.

5. A method for recovering a metal salt from an electrolyte containing the salt comprising 1) introducing a solution of a metal salt in an electrolyte wherein said metal salt is dissociated into a cation species and an anion species into an electrolytic cell having a first compartment and a second compartment, said compartments being separated by a selectively permeable membrane favoring the passage of hydrogen ions over the passage of said cation species and said anion species, said cell having a first electrode in said first compartment and a second electrode in said second compartment, said second electrode having closely associated therewith an anion exchange resin capable of sequestering said anion species;

2) retaining said metal salt in said electrolytic cell and passing an electric current through said cell from said second electrode to said first electrode for a period of time sufficient to sequester a fraction of said cation species at said first electrode and a fraction of said anion species in said ion exchange resin associated with said second electrode, whereby an electrolyte depleted of said metal salt is generated;

3) removing said depleted electrolyte from said electrolytic cell;

4) introducing into said electrolytic cell a regenerand electrolyte capable of receiving said metal salt in solution;

5) passing an electric current through said electrolytic cell from said first electrode to said second electrode for a period of time sufficient to release at least a portion of said cationic species from said first electrode and said anionic species from said ion exchange resin associated with said second electrode.

6. The method of claim 5 wherein said cation species is selected from the group consisting of copper ions, tin ions, lead ions, zinc ions, chromium ions, nickel ions, silver ions, and gold ions.

7. The method of claim 5 wherein said anion species is selected from the group consisting of sulfate ions, sulfite ions, fluoborate ions, nitrate ions, nitrite ions, phosphate ions, carbonate ions, chromate ions, fluoride ions, chloride ions, bromide ions, and iodide ions.

8. The method of claim 5 wherein said first electrode has closely associated therewith an cation exchange resin capable of sequestering said cation species.

9. The method of claim 8 wherein in said electrolytic cell said first electrode is located in a first compartment and said second electrode is located in a second compartment said first and second compartments being separated by a membrane having a greater permeability to hydrogen ions than to ions of said cation species.

10. The method of claim 9 wherein said cation species is selected from the group consisting of copper ions, tin ions, lead ions, zinc ions, chromium ions, nickel ions, silver ions, and gold ions.

11. The method of claim 9 wherein said anion species is selected from the group consisting of sulfate ions, sulfite ions, fluoborate ions, nitrate ions, nitrite ions, phosphate ions, carbonate ions, chromate ions, fluoride ions, chloride ions, bromide ions, and iodide ions.

12. The method of claim 9 wherein said cation species is a mixture of lead ion and tin ions and said anion species is fluoborate ion.

13. An electrolytic cell comprising a cathode chamber having a cathode suspended therein and an anode chamber having an anode suspended therein, said cathode chamber and said anode chamber being separated by an ion-selective permeable membrane favoring the passage of hydrogen ions over the passage of other ionic species, at least one of said cathode and said anode having an ion-exchange resin closely associated therewith.

14. The electrolytic cell of claim 13 wherein each of said cathode and said anode has an ion-exchange resin closely associated therewith.

* * * * *